US007156944B2

(12) United States Patent
Moeller et al.

(10) Patent No.: US 7,156,944 B2
(45) Date of Patent: Jan. 2, 2007

(54) FUSIBLE ADHESIVES CROSSLINKABLE BY RADIATION

(75) Inventors: Thomas Moeller, Duesseldorf (DE); Marcus Heemann, Neuss (DE); Andreas Ferencz, Duesseldorf (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 11/042,600

(22) Filed: Jan. 24, 2005

(65) Prior Publication Data

US 2005/0165164 A1 Jul. 28, 2005

Related U.S. Application Data

(63) Continuation of application No. PCT/EP03/07967, filed on Jul. 22, 2003.

(30) Foreign Application Priority Data

Jul. 27, 2002 (DE) ................ 102 34 369

(51) Int. Cl.
B29C 65/14 (2006.01)
B29C 65/40 (2006.01)
C08L 53/02 (2006.01)
C09J 153/00 (2006.01)
C08J 32/28 (2006.01)
C08F 2/46 (2006.01)

(52) U.S. Cl. .............. 156/275.5; 522/121; 522/110; 525/95; 525/193; 525/309; 156/275.7

(58) Field of Classification Search ........... 522/111, 522/112, 110, 121; 525/95, 193, 309; 156/275.5, 156/275.7
See application file for complete search history.

(56) References Cited

U.S. PATENT DOCUMENTS

| | | | |
|---|---|---|---|
| 4,152,231 A * | 5/1979 | St. Clair et al. ........... 522/110 |
| 4,820,746 A | 4/1989 | Rice et al. | |
| 4,948,825 A | 8/1990 | Sasaki | |
| 5,047,443 A | 9/1991 | Rehmer | |
| 5,093,406 A * | 3/1992 | Lossner et al. ............ 524/483 |
| 5,384,341 A * | 1/1995 | Itagaki et al. .............. 522/111 |
| 5,459,174 A * | 10/1995 | Merrill et al. ............... 522/35 |
| 5,668,931 A | 9/1997 | Dermer | |
| 5,750,622 A | 5/1998 | Himes | |
| 5,910,526 A | 6/1999 | Chu et al. | |
| 5,914,157 A * | 6/1999 | Munson et al. ............ 427/516 |
| 5,936,934 A * | 8/1999 | Kuribayashi et al. ....... 369/286 |
| 5,985,074 A | 11/1999 | Heemann et al. | |
| 6,063,838 A * | 5/2000 | Patnode et al. ............ 523/172 |
| 6,087,067 A * | 7/2000 | Kato et al. ............. 430/270.13 |
| 6,120,899 A * | 9/2000 | Cameron et al. ........... 428/407 |
| 6,306,555 B1 | 10/2001 | Schulz et al. | |
| 6,339,112 B1 | 1/2002 | Kauffman et al. | |
| 6,482,869 B1 | 11/2002 | Bolte et al. | |
| 6,486,229 B1 * | 11/2002 | Hu et al. .................... 522/80 |
| 6,541,553 B1 * | 4/2003 | Erickson et al. ............ 524/270 |
| 6,641,911 B1 | 11/2003 | Puerkner et al. | |
| 2003/0171448 A1 | 9/2003 | Husemann et al. | |
| 2003/0190467 A1 | 10/2003 | Husemann et al. | |

FOREIGN PATENT DOCUMENTS

| | | |
|---|---|---|
| DE | 694 18 829 T2 | 1/2000 |
| DE | 100 63 066 A1 | 6/2001 |
| DE | 100 29 554 A1 | 1/2002 |
| EP | 0 451 920 B1 | 7/1999 |
| WO | WO 01/13935 A1 | 9/1991 |
| WO | WO 95/33794 A1 | 12/1995 |
| WO | WO 99/64529 A1 | 12/1999 |
| WO | WO99/67340 | 12/1999 |
| WO | WO 00/22062 A1 | 4/2000 |
| WO | WO 00/27942 A1 | 5/2000 |
| WO | WO 00/29456 A1 | 5/2000 |
| WO | WO 01/16244 A1 | 3/2001 |
| WO | WO 02/10307 A2 | 2/2002 |

OTHER PUBLICATIONS

Database WPI, Section Ch, Week 198806, Derwent Publications Ltd., London, GB; Class A81, AN 1988-038449, XP 002263484 for JP62 295979 (1987).
C. G. Roffey, "Photogeneration of Reactive Species for UV Curing", Verlag John Wiley & Sons, pp. 182 (Vinyl-Derivate), pp. 482-485 (ungesattigte Polyester), pp. 487-502 (Polyester-, Polyether-, Epoxy-, Polyurethan- und Melamin-Acrylate), pp. 504-508 (strahlenvernetzbare Organopolysiloxan-Polymere), pp. 537-560, pp. 192-194 and pp. 514-517 (1997).
R. Holman et al., "U.V. and E.B. Curing Formulation for Printing Inks, Coatings and Paints", Verlag SIFA (Selective Industrial T raining Associates Limited, London, U.K.), 2nd Edition, pp. 23-26 (Epoxy-Acrylate), pp. 27-35 (Urethan-Acrylate), pp. 36-39 (Polyester-Acrylate), pp. 39-41 (Polyether-Acrylate), p. 41 (vinyl-Polymere, pp. 42-43 (ungesattigte Polyester), pp. 52-59, 75-77 and p. 44 (1988).
Auchter et al., "UV-vernetzbare Acrylat-Schmelzhaftklebstoffe", in kleben & dichten vol. 37, pp. 14-20 (1993).
S. P. Pappas, "UV Curing" Science and Technology, Technology Marketing Corporation, pp. 2-20, Table vl, pp. 44-45, pp. 234-243 and pp. 245-246 (1978).

(Continued)

Primary Examiner—Susan Berman
(74) Attorney, Agent, or Firm—Stephen D. Harper

(57) ABSTRACT

To obtain an adhesive having both a high initial adhesive capacity and high heat resistance, a fusible adhesive which can be cross-linked by radiation and a low tendency to creep is provided. The adhesive contains 0 to 40 weight percent of at least one elastomer which cannot be cross-linked by radiation, 15 to 40 weight percent of at least one compound containing at least two olefinic double bonds, and 20 to 85 weight percent of at least one tackifier. The adhesive is especially suitable for use on high speed labeling machines.

22 Claims, No Drawings

OTHER PUBLICATIONS

J. V. Crivello, "Photoinitiated Cationic Polymerization" in UV Curing: Science and Technology, Editor S.P. Pappas, pp. 24-71 (1980).

Oswald et al., "Organic Sulfur Compounds. XIX. Addition of Dithiols to Diallyl Maleate: A New Concept of Polyester Synthesis", Die Makromolekulare Chemis, vol. 97, pp. 258-266 (1966).

"Standard Test Method for Apparent Viscosity of Hot Melt Adhesives and Coating Materials", ASTM International, ASTM D 3236-88, pp. 1-8 (2004).

Adhesives Age, Apr. 1991, "Radiation Curing of Isoprene-Based PSAs", Berejka et al., pp. 30-34.

Tech XIV-Technical Seminar Proceedings, May 1-3, 1991, "Novel Concepts for Classic Materials: Radiation Curing of Isoprene Based Pressure Sensitive Adhesives", Berejaka et al., pp. 175-185.

Downloaded from www.IISRP.com, "Synthetic Polyisoprene", publication date and author unknown.

Goodyear Chemical Product Data Sheet, NATSYN® 2200/2210.

Royal Elastomers, Isolene® Liquid Synthetic Rubber.

\* cited by examiner

FUSIBLE ADHESIVES CROSSLINKABLE BY RADIATION

CROSS-REFERENCE TO RELATED APPLICATIONS

This application is a continuation under 35 USC Sections 365(c) and 120 of International Application No. PCT/EP2003/007967, filed 22 Jul. 2003 and published 12 Feb. 2004 as WO 2004/013244, which claims priority from German Application No. 10234369.1, filed 27 Jul. 2002, each of which is incorporated herein by reference in its entirety.

FIELD OF THE INVENTION

This invention relates to radiation-crosslinkable hotmelt adhesives and to their production and use.

DISCUSSION OF THE RELATED ART

Hotmelt adhesives (hotmelts) are generally understood to be water-free, solventless adhesives which are solid to wax-like at room temperature and which are applied to the substrates to be bonded from the melt and, after the substrates have been fitted together, set physically on cooling and solidify in the process. Hotmelt pressure-sensitive adhesives (HMPSAs), which belong to the group of hotmelts, remain permanently tacky on cooling and, under light pressure, adhere immediately to almost all substrates.

Hotmelt pressure-sensitive adhesives are widely used on an industrial scale, for example in the beverage industry for labeling, in the packaging industry, in the graphic industry, for example bookbinding, or for the production of disposable articles, for example toilet paper or diapers.

The main advantage of hotmelt pressure-sensitive adhesives is that they can be applied without solvents. This eliminates the need for expensive intermediate drying steps. Since solvent-based adhesive systems are having to meet increasingly more stringent environmental requirements, hotmelt pressure-sensitive adhesives are also advantageous from the ecological perspective.

Typical hotmelt pressure-sensitive adhesives are composed of basic polymers, tackifying resins, optionally plasticizer oils and various additives. Commonly used basic polymers include styrene copolymers, for example styrene/isoprene/styrene (SIS), styrene/butadiene/styrene (SBS), styrene/ethylene/butylene/styrene (SEBS) block copolymers; ethylene/vinyl acetate (EVA) polymers or amorphous poly-α-olefins (APAO).

According to EP 0451920 B1, hotmelt pressure-sensitive adhesives based, for example, on styrene/isoprene/styrene block copolymers can be crosslinked with UV light in the presence of (optionally copolymerized) photoinitiators or by electron beams.

Polyacrylate-based hotmelt pressure-sensitive adhesives are also known. Thus, WO 02/10307 describes pressure-sensitive adhesive compositions based on block copolymers of the general type P(B)-P(A/C)-P(B), each block copolymer consisting of a middle copolymer block P(A/C), for example of copolymers of acrylates and isoprene, and two end polymer blocks P(B), for example of styrene. The polymer P(A/C) has a glass transition temperature of 0° C. to −80° C., component C having at least one functional group which behaves inertly in a radical polymerization reaction and P(B) representing a polymer of the monomer B, the polymer P(B) having a glass transition temperature of 20° C. to 175° C. and the polymer block P(B) being insoluble in the copolymer block P(A/C) and the blocks P(B) and P(A/C) being immiscible. The hotmelt pressure-sensitive adhesives in question are used for the production of adhesive tapes.

With a view to providing a pressure-sensitive adhesive with good adhesive strength at high temperatures, DE 69418829 T2 discloses a radiation-curable composition comprising (A) a polyurethane oligomer capped by a terminal acryl or methacryl group reactive to radiation and a terminal monool or polyol group non-reactive to radiation and (B) a mercapto compound containing no more than one SH group in a quantity of about 0.1 to 2.0% by weight of the polyurethane oligomer.

The curable composition is then applied to the desired substrate, for example to silicone covering paper, fabric or film, after which the coated substrate is exposed to electron beams or ultraviolet radiation with a wavelength of 1,800 to 4,000 A for a sufficient time to initiate and complete the polymerization. The disadvantage here is that liquid adhesives (oligomers) with very poor early adhesion are used.

WO 00/27942 describes a process for the production of a radiation-crosslinkable hotmelt adhesive consisting essentially of a depolymerized elastomer of relatively low molecular weight, an elastomer of relatively high molecular weight and of a tackifyng resin and a plasticizer. This hotmelt adhesive is preferably used for coating self-adhesive labels. After crosslinking by UV radiation or electron beams, it is distinguished by good adhesion properties at low temperatures to room temperature.

The disadvantage of using depolymerized polymers is that depolymerization reactions can generally lead to products with highly variable quality control data so that it becomes difficult to produce adhesive formulations to specification.

WO 00/22062 describes radiation-crosslinkable adhesives containing block copolymers with at least one butadiene block, in which the 1,2-vinyl content is at least 25% by weight, and also partly hydrogenated resin and partly or completely saturated oil. The block copolymers are, in particular, styrene block copolymers produced by anionic polymerization with incorporation of a multivalent coupling compound. The adhesive compositions are distinguished by a low viscosity, but are likely to show poor thermal stability in the melt for applications involving temperatures above 160° C.

Against the background of this prior art, the problem addressed by the present invention was to provide hotmelt pressure-sensitive adhesives with improved processing and performance properties which would have a low viscosity coupled with high early adhesion and high heat resistance of the bond. Good adhesion, particularly to plastic surfaces, would be guaranteed. Other properties important to the processing of hotmelt pressure-sensitive adhesives would be improved where possible or at least maintained. In particular, the hotmelt pressure-sensitive adhesives would be usable in high-speed labeling machines and would guarantee uninterrupted machine operation.

BRIEF SUMMARY OF THE INVENTION

The present invention provides a low-creep radiation-crosslinkable hotmelt pressure-sensitive adhesive containing 0 to 40% by weight of at least one natural or synthetic, non-radiation-crosslinkable elastomer as component (A), 15 to 40% by weight of at least one compound containing at least two olefinic double bonds as component (B) and 20 to 85% by weight of a tackifying resin as component (C).

DETAILED DESCRIPTION OF CERTAIN EMBODIMENTS OF THE INVENTION

Elastomers are polymers with rubber-like behavior which can be repeatedly stretched to at least twice their length at 20° C. and, after removal of the force applied for stretching, immediately return to their original length. Elastomers have a glass transition temperature $T_g$ of generally below 0° C. From the group of elastomers, acrylate, polyester urethane, ethylene acrylate, butyl rubber; natural rubber; ethylene/propylene copolymers; ethylene/vinyl acetate copolymers or styrene copolymers, individually or as mixtures, are preferred for the purposes of the invention. The copolymers are statistical, alternating graft or block copolymers. Elastomer blends, more particularly EPDM/PP, NR/PP, EVA/PVDC and NBR/PP, and polyurethanes, polyether esters and polyether amides are also used in accordance with the invention.

Within the group of elastomers, thermoplastic elastomers are particularly preferred. Thermoplastic elastomers (TPE) are known per se. They are polymers—also known as thermoplastic rubbers—which ideally have a combination of the performance properties of elastomers and the processing properties of thermoplastics. This can be achieved through the simultaneous presence in the corresponding polymers of soft and elastic segments with high elasticity and a low glass transition temperature and hard, crystallizable segments with low elasticity, a high glass transition temperature and a tendency to form associates. Thermoplastic elastomers are characterized by thermolabile, reversible cleavable crosslinking sites generally physical, but also chemical in character. According to the invention, the thermoplastic elastomers (component (A)) are selected in particular from the group of styrene block polymers, for example styrene and styrene/diene copolymers (SBS, SIS, SBR), styrene/ethylene/butylene copolymers (SEBS) or styrene/ethylene/propylene/styrene copolymers (SEPS). SEBS polymers are marketed, for example, by the Shell Chemical Company under the name of Kraton®; SEPS polymers are obtainable from the Kuraray Company in Japan under the name of Septon®. SIS polymers are marketed by the Dexco Polymer Corp. under the name of Vector and by Enichem Elastomers under the name of Europren.

The radiation-crosslinkable hotmelt pressure-sensitive adhesive according to the invention contains as component (B) 15 to 40% by weight and preferably 20 to 35% by weight of at least one compound containing at least two olefinic double bonds. The olefinic double bonds are preferably vinylic double-bonds.

The main chain and/or side chain of component (B) may optionally contain alkyl groups, alkoxyl groups or halogen atoms, more particularly chlorine or bromine.

In a preferred embodiment, the radiation-crosslinkable hotmelt pressure-sensitive adhesive according to the invention contains as component (B) at least one diolefin homopolymer or copolymer (B1), the percentage content of recurring diolefin units in component (B1) being from 50 to 100% by weight and preferably from 60 to 90% by weight and component (Bi) containing olefinic double bonds along the main chain.

"Diolefins" are understood to be unsaturated, aliphatic and cycloaliphatic hydrocarbons containing two double bonds in the molecule, i.e., alkadienes and cyclodienes. The diolefins preferably contain conjugated double bonds. A "recurring" unit is understood to be the smallest constitutional unit of a polymer chain.

According to the invention, component (B1) is preferably selected from homo- or copolymers of 1,3-butadiene, 2-methyl-1,3-butadiene (isoprene), 1,3-pentadiene, 2-ethyl-1,3-butadiene, 2-propyl-1,3-butadiene, 2-isopropyl-1,3-butadiene, 2-hexyl-1,3-butadiene, 2,3-dimethyl-1,3-butadiene, 2,3-diethyl-1,3-butadiene, 2-methyl-1,3-pentadiene, 2-methyl-1,3-hexadiene, 2-methyl-1,3-octadiene, 2-methyl-1,3-decadiene, 2,3-dimethyl-1,3-pentadiene, 2,3-dimethyl-1,3-hexadiene, 2,3-dimethyl-1,3-octadiene and 2,3-dimethyl-1,3-decadiene, 2-methyl-1,3-cyclopentadiene, 2-methyl-1,3-cyclohectadiene, 2,3-dimethyl-1,3-cyclopentadiene, 2,3-dimethyl-1,3-cyclohexadiene, 2-chloro-1,3-butadiene, 2,3-dichloro-1,3-butadiene, 1-fluoro-1,3-butadiene, 2-chloro-1,3-pentadiene, 2-chloro-1,3-cyclopentadiene and 2-chloro-1,3-cyclohexadiene.

Homo- or copolymers of isoprene are particularly preferred as component (B1).

In one particularly preferred embodiment, a diolefin homo- or copolymer (B2) is used as component (B), the percentage content of recurring diolefin units in component (B2) being from 50 to 100% by weight and preferably from 60 to 90% by weight, component (B2) having olefinic double bonds in the side chains and optionally along the main chain and the percentage content of vinylic double bonds being from 5 to 100%, preferably from 20 to 95% and more particularly from 30 to 90%, based on the total number of olefinic double bonds in component (B2).

According to the invention, homopolymers of 1,3-butadiene, 2-methyl-1,3-butadiene (isoprene), 1,3-pentadiene and cyclopentadiene are preferably used as component (B2).

Polyisoprenes containing 6 to 7% of the recurring 3,4-isoprene unit are obtained, for example, by polymerization of isoprene in the presence of butyl lithium.

In a particularly preferred embodiment, at least one homopolymer of 1,3-butadiene, in which the percentage content of vinylic double bonds is from 30 to 100% and preferably from 50 to 95% in the polymer, is used as component (B2).

In another preferred embodiment, an alternating, statistical gradient or graft copolymer of poly(1,2-butadiene), poly(1,2-isoprene) or poly(3,4-isoprene) is used as component (B2).

In another preferred embodiment, component (B2) is a copolymer obtainable by reaction of monomers from the group consisting of 1,3-butadiene, 2-methyl-1,3-butadiene, 1,3-pentadiene and/or cyclopentadiene:

a) with monomers of the dienes mentioned with one another; and/or
b) with monomers from the group consisting of 2,3-dimethyl-1,3-butadiene, 1,4-pentadiene, 2,3-pentadiene; and/or
c) with at least one monoolefinically unsaturated monomer from the group consisting of ethylene, propylene, butylene, hexene, octene, acrylates, acrylonitrile, vinyl ester, vinyl nitrile, aromatic vinyl compounds, such as styrene for example.

In another embodiment, component (B2) is a homo- and/or copolymer of monomers from the group consisting of 1,3-butadiene, 2-methyl-1,3-butadiene, 1,3-pentadiene and/or cyclopentadiene which contain at least one and preferably 2 to 3 functional groups, for example hydroxyl groups, amino groups, epoxide groups, isocyanate groups, carboxyl groups, carboxylic anhydride groups, mercapto groups, silane groups and/or hydrosilyl groups. The functional groups are such that they react with other functional groups to form covalent bonds. Mixtures of polymers with the features of component (B2), where one component (B2) is hydroxyfunctional and another component (B2) bears at least one functional group selected from the group of isocyanate groups, anhydride groups and epoxide groups, are preferred.

In another embodiment, diolefin homopolymers and/or copolymers modified by at least one other radiation-crosslinkable functional group, for example an acrylate, methacrylate or epoxy group, are used as component (B1) or (B2).

In mixtures of (B1) with (B2), (B1) is present in the hotmelt pressure-sensitive adhesive composition according to the invention in a quantity of 1 to 35% by weight, preferably 5 to 35% by weight and more particularly 10 to 30% by weight.

The molecular weights of components (B1) and (B2) are in the range from 500 to 100,000 g/mol, preferably in the range from 1,000 to 60,000 g/mol and more particularly in the range from 500 to 20,000 g/mol.

The viscosities of (B1) and (B2) are in the range from 60 mPa.s to 1,500 mPa.s at 20° C. or in the range from 500 mPa.s to 2,000 mPa.s at 100° C.

In another embodiment of the invention, component (B) of the radiation-crosslinkable hotmelt pressure-sensitive adhesive according to the invention consists of at least one compound (B3) selected from the group of unsaturated polyesters, polyethers or polyurethanes, polyacrylic and/or polymethacrylic acid alkyl esters, (meth)acrylic acid homopolymers and/or copolymers and/or vinyl polymers. Compounds suitable for the purposes of the invention are described, for example, by C. G. Roffey in "Photogeneration of Reactive Species for UV Curing", John Wiley & Sons, 1997, on pages 182 (vinyl derivatives), 482–485 (unsaturated polyesters), 487–502 (polyester, polyether, epoxy, polyurethane and melamine acrylates), 504–508 (radiation-crosslinkable organosiloxane polymers) and by R. Holman and P. Oldring in "U.V. and E.B. Curing Formulation for Printing Inks, Coatings and Paints", SIFA (Selective Industrial Training Associates Limited, London, U.K.), 2nd Edition, 1988, on pages 23–26 (epoxy acrylates), 27–35 (urethane acrylates), 36–39 (polyester acrylates), 39–41 (polyether acrylates), 41 (vinyl polymers), 42–43 (unsaturated polyesters).

Comonomers of (meth)acrylic acid which contain styrene, methyl styrene and/or other alkyl styrenes and α-olefins as comonomer are preferred as component (B3).

Acrylate or methacrylate esters with a functionality of two and/or more are particularly suitable as component (B3). Such acrylate or methacrylate esters include, for example, esters of acrylic acid or methacrylic acid with aromatic, aliphatic or cycloaliphatic polyols or acrylate esters of polyether alcohols. Suitable compounds are described by C. G. Roffey in "Photogeneration of Reactive Species for UV Curing" on pages 537–560 and by R. Holman and P. Oldring in "U.V. and E.B. Curing Formulation for Printing Inks, Coatings and Paints" on pages 52–59.

Acrylate esters of aliphatic polyols containing 2 to about 40 carbon atoms include, for example, neopentylglycol di(meth)acrylate, 1,6-hexanediol di(meth)acrylate, trimethylolpropane tri(meth)acrylate, pentaerythritol tetra(meth) acrylate and (meth)acrylate esters of sorbitol and other sugar alcohols. These (meth)acrylate esters of aliphatic or cycloaliphatic diols may be modified with an aliphatic ester or an alkylene oxide. Acrylates modified by an aliphatic ester include, for example, neopentylglycol hydroxypivalate di(meth)acrylate, caprolactone-modified neopentylglycol hydroxypivalate di(meth)acrylates and the like. Alkylene oxide-modified acrylate compounds include, for example, ethylene oxide-modified neopentylglycol di(meth)-acrylates, propylene oxide-modified neopentylglycol di(meth) acrylates, ethylene oxide-modified 1,6-hexanediol di(meth) acrylates or propylene oxide-modified 1,6-hexanediol di(meth)acrylates or mixtures of two or more thereof.

Acrylates or methacrylates containing aromatic groups may also be used. These include corresponding bisphenol A compounds, for example diacrylates or dimethacrylates of adducts of bisphenol A with alkylene oxides, for example adducts of bisphenol A with ethylene oxide and/or propylene oxide. Acrylate monomers based on polyether polyols include, for example, neopentylglycol-modified (meth)acrylates, trimethylolpropane di(meth)-acrylates, polyethylene glycol di(meth)acrylates, polypropylene glycol di(meth) acrylates and the like. Acrylate monomers with a functionality of three or more include, for example, trimethylolpropane tri(meth)acrylate, pentaerythritol tri- and tetra(meth) acrylate, dipentaerythritol tetra(meth)acrylate, dipentaerythritol penta(meth)acrylate, dipentaerythritol hexa(meth)acrylate, caprolactone-modified dipentaerythritol hexa(meth)-acrylate, pentaerythritol tetra(meth)acrylate, tris[(meth)acryloxyethyl]isocyanurate, caprolactone-modified tris[(meth)acryloxyethyl]isocyanurate or trimethylolpropane tetra(meth)acrylate or mixtures of two or more thereof.

Of the above-mentioned acrylate monomers with a functionality of two, three or more, which may be used as component B in accordance with the invention, di-, tri- and tetrapropylene glycol diacrylate, neopentyl glycol propoxylate di(meth)acrylate, trimethylolpropane tri(meth)acrylate, trimethylolpropane monoethoxytri(meth)acrylate and pentaerythritol triacrylate are preferred.

(Meth)acrylate esters based on polyols containing urethane groups may be produced by reacting a polyol with a difunctional or higher isocyanate to form OH-terminated polyurethane prepolymers which are esterified with (meth) acrylic acid to form the corresponding diesters.

Component (B3) is present in the radiation-crosslinkable hotmelt pressure-sensitive adhesive according to the invention in a quantity of 0 to 40% by weight, preferably 5 to 35% by weight and more particularly 10 to 30% by weight. If, in mixtures of (B2) with (B3), the percentage content of vinylic double bonds in component (B2) is 5 to 30%, based on the total number of olefinic double bonds in component (B2), the hotmelt pressure-sensitive adhesive contains 10 to 35% by weight and preferably 15 to 30% by weight of component (B3).

In another embodiment of the invention, the radiation-crosslinkable hotmelt pressure-sensitive adhesive according to the invention contains at least one compound (L) selected from the group of elastomers (A), these elastomers being modified with at least two radiation-crosslinkable functional groups, for example with acrylate, methacrylate or epoxide groups.

The hotmelt pressure-sensitive adhesive according to the invention contains at least one tackifying resin as component (C). The resin provides for additional tackiness and improves the compatibility of the hotmelt pressure-sensitive adhesive components. It is used in a quantity of 20 to 85% by weight, preferably 30 to 70% by weight and more particularly 35 to 65% by weight. The tackifying resin is, in particular, a resin with a softening point of 90 to 120° C. (ring-and-ball method). Such resins are aromatic, aliphatic or cycloaliphatic hydrocarbon resins and modified or hydrogenated versions thereof. Examples include aliphatic or alicyclic petroleum hydrocarbon resins and hydrogenated derivatives thereof. Other resins suitable for the purposes of the invention are:

a) hydroabietyl alcohol and esters thereof, more especially esters with aromatic carboxylic acids, such as terephthalic acid and phthalic acid;
b) preferably modified natural resins, such as resinic acids of gum rosin, liquid rosin or wood rosin, for example fully saponified gum rosin or alkyl esters of optionally partly hydrogenated rosin with low softening points, for example methyl, diethylene glycol, glycerol and pentaerythritol esters;
c) terpene resins, more particularly terpolymers or copolymers of terpene, for example styrene terpenes, (x-methylstyrene terpenes, phenol-modified terpene resins and hydrogenated derivatives thereof;
d) acrylic acid copolymers, preferably styrene/acrylic acid copolymers; and
e) resins based on functional hydrocarbon resins.

An alkyl ester of partly hydrogenated rosin—the alkyl group preferably containing 1 to 6 carbon atoms—may also be used as the tackifying resin.

Partly polymerized liquid rosin, hydrogenated hydrocarbon resin and rosin glycerol ester are preferably used.

In the context of the present invention, the "radiation-crosslinkable" feature is understood to be the initiation of a polymerization reaction under the influence of radiation (photopolymerization). By radiation is meant any form of radiation which produces irreversible crosslinking in the crosslinkable pressure-sensitive hotmelt adhesive layer to be exposed to radiation. UV light, electron beams, short-wave visible light and even IR radiation are particularly suitable. In the case of EB or UV irradiation, the desired product properties are established through the radiation dose and, in the case of IR radiation, through the product temperature and the residence time.

An overview of the prior art on the radiation crosslinking of hotmelt pressure-sensitive adhesives is presented, for example, by R. Jordan under the title "Schmelzhaftklebstoffe", Vol. 6b from the series "Klebstoff-Monographien" published by Hinderwaldner-Verlag, 1989, pages 126 to 155 and in the article entitled "UV-vernetzbare Acrylat-Schmelzhaftklebstoffe" by Auchter, Barwich, Rehmer and Jäger in "kleben&dichten" 37 (1993), pages 14 to 20.

Radiation crosslinking by UV light or electron beams is preferred for the purposes of the present invention. The exposure of the pressure-sensitive hotmelt adhesive according to the invention to UV light takes place at a wavelength of 100 to 380 nm. The UV rays are generally produced in gas discharge lamps of which mercury vapor lamps in particular may be used as medium- and high-pressure lamps (1 to 10 bar). A UV dose of 50 to 2,000 $J/cm^2$ may be applied. Where the hotmelt pressure-sensitive adhesive according to the invention is exposed to electron beams, a radiation dose of 10 to 100 kilogray (kGy) is preferred. If the hotmelt pressure-sensitive adhesive according to the invention is exposed to UV light, crosslinking is controlled not only by the particular radiation dose, but also by the use of photoinitiators, photosensitizers or controller molecules.

The radiation-crosslinkable hotmelt pressure-sensitive adhesive contains 0 to 10% by weight of at least one photoinitiator, photosensitizer and/or controller molecule as component (D). Where the hotmelt pressure-sensitive adhesive according to the invention is exposed to UV light, it contains at least one photoinitiator in a quantity of 0.1 to 10% by weight and preferably in a quantity of 0.2 to 5% by weight. Basically, any commercially available photoinitiators that are compatible, i.e., form at least substantially homogeneous mixtures, with the hotmelt pressure-sensitive adhesive according to the invention may be used for the purposes of the invention. The photoinitiators are substances or mixtures of substances which are stable in the absence of light and, on exposure to radiation, absorb so much energy that they initiate radical or ionic polymerizations. Radical polymerizations are initiated, for example, by the decomposition of peroxides, disulfides, benzoin derivatives and certain aliphatic ketones. Radically active photoinitiators suitable for the purposes of the invention are described in S. P. Pappas, "UV Curing: Science and Technology", Technology Marketing Corporation, 1978, on pages 2–20. Photoinitiators from the following group are preferred: benzoin and benzoin derivatives and phenyl hydroxyalkanone types and thioxanthone types. Ketone-based photoinitiators are described by R. Holman and P. Oldring in "U.V. and E.B. Curing Formulation for Printing Inks, Coatings and Paints" on pages 75–77. The following are particularly suitable for the purposes of the invention: benzophenone, 2,4,6-trimethyl benzophenone, 4-methyl benzophenone or mixtures of alkyl benzophenones, for example ESACURE TZT, camphor quinone, QUANTACURE (a product of International Bio-Synthetics), KAYACURE MBP (a product of Nippon Kayaku), ESACURE BO (a product of Fratelli Lamberti), TRIGONAL 14 (a product of Akzo), photoinitiators of the Irgacure®, Darocure® or Speedcure® series (products of Ciba Geigy), Darocure® 1173 and/or Fi-4 (made by the Eastman Company). Of these, Irgacure® 651, Irgacure® 369, Irgacure® 184, Irgacure® 907, Irgacure® 1850, Irgacure® 1173 (Darocure® 1173), Irgacure® 1116, Speedcure® EDB, Speedcure® ITX, Irgacure® 784 or Irgacure® 2959 or mixtures of two or more thereof are especially suitable.

In the case of cationic photopolymerization, the photoinitiators undergo molecule cleavage under the effect of the UV radiation and, at the same time, form free Lewis or Brönstedt acids. Preferred cationic photoinitiators are, for example, the aryldiazonium salts known to the expert, for example diaryl iodonium salts or triaryl sulfonium salts. The use of iodonium salts as photoinitiators in cationically polymerizable compositions is described by J. V. Crivello, "Photoinitiated Cationic Polymerization" in: UV Curing: Science and Technology, Editor S. P. Pappas, pages 24 to 71, Technology Marketing Corporation, Norwalk, Conn. 1980, ISBN No. 0-686-23773-0 or in patent application DE 163066 Al. Preferred cationic photoinitiators are named in Pappas, loc. cit., Table VI, pages 44–45.

A photoinitiator with a molecular weight of more than about 150 is at least partly used in one preferred embodiment of the invention. Commercially available photoinitiators which meet this requirement are, for example, Darocure® 1173, Esacure® KIP 150 and Irgacure® 369.

Among the polymeric photoinitiators, polymeric cinnamic acid esters, for example polyvinyl cinnamate, are preferred. On exposure to UV radiation, cinnamates form truximates or truxillates as dimerization products. The mode of action and examples of suitable cinnamates and the alkyl, aryl or acyl azides which may also be used are described in C. Roffey, "Photogeneration of Reactive Species for UV Curing", pages 192–194 and in P. Pappas "UV Curing: Science and Technology", pages 234–243.

It is also possible to provide the photoinitiator with a functional group polymerizable by exposure to UV light or to electron beams, in which case the functional group polymerizable by exposure to UV light or to electron beams can be attached to the photoinitiator, for example by reaction of the photoinitiator with an unsaturated carboxylic acid. Suitable unsaturated carboxylic acids are, for example, acrylic acid and methacrylic acid. The reaction products of Irgacure® 2959 with acrylic acid or methacrylic acid are particularly suitable for the purposes of the invention. Accordingly, a compound which contains both a photoinitiator and a functional group polymerizable by exposure to UV light or to electron beams may be used as the photoinitiator.

Co-initiators, for example amines, such as Photomer® 4127F or Uvecryl® 7100, or photosensitizers may also be used. Through the use of photosensitizers, the absorption waves of photopolymerization initiators can be shortened and/or extended to longer wavelengths and the crosslinking rate thus accelerated. The radiation of a certain wavelength which they absorb is transmitted as energy to the photopolymerization initiator.

According to the invention, preferred photosensitizers are, for example, acetophenone, benzophenone and fluorescein and derivatives thereof.

In one particularly advantageous embodiment, the hotmelt pressure-sensitive adhesive according to the invention contains 0 to 15% by weight and preferably 5 to 12% by weight of at least one compound from the group of mercaptans and/or thio compounds with a functionality of two or more as component (E). Component (E) reacts with component (A) and/or (B1) and/or (B2) and/or (B3) in a so-called "thiol-ene" reaction.

Thiol-ene reactions have been known for some time and are described, for example, by Oswald in "Die Makromolekulare Chemie", 97, 258–266 (1966) and by R. Holman and P. Oldring in "U.V. and E.B. Curing Formulation for Printing Inks, Coatings and Paints" on page 44, by C. G. Roffey in "Photogeneration of Reactive Species for UV Curing" on pages 514–517 and by P. Pappas in "UV Curing: Science and Technology" on pages 245–246. To carry out the thiol-ene reaction, polythiols and polyenes are generally mixed together and crosslink radically to form polythiol ethers. Acid-catalyzed crosslinking is also known from the literature.

The polythiols contain at least two thiol groups. However, polythiols containing three or four thiol groups, such as pentaerythritol tetrakis(betamercaptopropionate), may also be used.

The thiol groups may advantageously be introduced starting from hydroxy groups present which are esterified, for example, with thioglycolic acid. In this way, pentaerythritol, for example, may be esterified with thioglycolic acid to form pentaerythritol tetrathioglycolate. Cyclic polyols, such as sugar alcohols for example, may also be similarly esterified. Actual compounds suitable for the purposes of the invention are, for example, pentaerythritol tetrathioglycolate, pentaerythritol tetramercaptoacetate, pentaerythritol mercaptopropionate (PETMP), trimethylolpropane trithioglycolate, dithioglycol, triglycol dithiol, dipentadimercaptan, ethyl cyclohexyl dimer mercaptan, 1,6-hexane dimercaptan, ethanedithiol dimethacrylate, propanedithiol dimethacrylate. Mercapto-terminated polysulfide resins may also be used. Alkylene oxide-modified polythiols are preferably used. Actual examples are ethoxylated and/or propoxylated polythiol based on trimethylol propane and pentaerythritol. Other suitable compounds are described by C. G. Roffey in "Photogeneration of Reactive Species for UV Curing" on pages 514–517 and by R. Holman and P. Oldring in "U.V. and E.B. Curing Formulation for Printing Inks, Coatings and Paints" on page 44.

In order to achieve the required performance properties such as, for example, a certain cohesive strength, viscosity, softening point or setting rate, other additives may have to be incorporated in the adhesive formulation. These include plasticizers for increasing flexibility, stabilizers, antioxidants for reducing oxidative changes during application of the melt under the influence of oxygen and for improving the ageing behavior of the bonded joint. In addition, fillers may be used to increase strength and optionally to reduce costs.

The plasticizer, component (F), is preferably used for viscosity adjustment and is present in the hotmelt pressure-sensitive adhesive according to the invention in a concentration of generally 0 to 30% by weight and preferably 5 to 25% by weight.

Suitable plasticizers are medicinal white oils, naphthenic mineral oils, phthalates, adipates, polypropylene, polybutene, polyisoprene oligomers, hydrogenated polyisoprene and/or polybutadiene oligomers, benzoate esters, vegetable or animal oils and derivatives thereof. Hydrogenated plasticizers are selected from the group of paraffinic hydrocarbon oils—commercially available, for example, under the name of Primol® from Exxon—polyisobutylenes, poly-1-butene oils or hydrogenated naphthenic oils. The polyisobutylenes preferably have an average molecular weight of 600 to 5,000 and more particularly in the range from 800 to 4,000. Typically, they are liquids with a high viscosity at room temperature. Suitable polyisobutylenes are available under the name of "Parapol" from Exxon Chemicals or under the name of "Oppanol" from BASF.

Preferred paraffin oils have a viscosity of 100 to 600 mPas and preferable in the range from 150 to 300 mPas at 25° C. They are obtainable as, "Kaydol" from Witco or as Primol 352 from Esso. Monohydric or polyhydric alcohols, preferably glycol monophenyl ether, hexamethylene glycol, glycerol and, in particular, polyalkylene glycols with a molecular weight of 200 to 6,000, may also be used. Polyethylene glycols with a molecular weight of up to ca. 1,000 and preferably up to ca. 600 are preferred. Polypropylene glycol, polybutylene glycol and polymethylene glycol may also be used.

Esters are preferably used as plasticizers, including for example liquid polyesters and glycerol esters, such as glycerol diacetate and glycerol triacetate, neopentyl glycol dibenzoate, glyceryl tribenzoate, pentaerythritol tetrabenzoate and 1,4-cyclohexane dimethanol dibenzoate. Finally, alkyl monoamines and fatty acids preferably containing 8 to 36 carbon atoms, may also be used.

Plasticizers based on aromatic dicarboxylic acid esters, i.e. the corresponding esters of phthalic acid, isophthalic acid or terephthalic acid, are preferably used. The alcohol component of these esters used as plasticizers normally contains 1 to 8 carbon atoms.

Alkyl monoamines and fatty acids are also suitable plasticizers, alkyl monoamines and fatty acids containing 8 to 36 carbon atoms being preferred.

Waxes in quantities of 0 to 30% by weight may optionally be added to the hotmelt pressure-sensitive adhesive as component (G). The quantity is gauged so that, on the one hand, viscosity is reduced to the required range and, on the other hand, adhesion is not adversely affected. The wax used may be of natural, chemically modified or synthetic origin. Suitable natural waxes are vegetable waxes, animal waxes, mineral waxes or petrochemical waxes. Suitable chemically modified waxes are hard waxes, such as montanic ester waxes, sarsol waxes, etc. Suitable synthetic waxes are polyalkylene waxes and polyethylene glycol waxes. Preferred waxes are petrochemical waxes, such as petrolatum, paraffin waxes, microwaxes and synthetic waxes, more particularly polyethylene waxes with melting points of 85 to 140° C. and molecular weights in the range from 500 to 3,500, paraffin waxes with melting points of 45 to 70° C. and molecular weights of 225 to 500, microcrystalline waxes with melting points of 60 to 95° C. and synthetic Fischer-Tropsch waxes with melting points of 100 to 115° C.

In addition, typical auxiliaries and additives may be incorporated in the hotmelt pressure-sensitive adhesive according to the invention as component (H). Stabilizers are mentioned first and foremost in this regard. Their function is to prevent the reactive monomers from entering into an unwanted or premature reaction and to protect the polymers against decomposition during processing. Such stabilizers are, in particular, antioxidants. They are added to the hotmelt pressure-sensitive adhesive in quantities of typically up to 3% by weight and preferably about 0.1 to 1.0% by weight.

The stabilizers, more particularly UV stabilizers, initiators or antioxidants suitable for use as additives in accordance with the present invention include phosphites, phenols, sterically hindered phenols of high molecular weight ($M_n$), polyfunctional phenols, sulfur- and phosphorus-containing phenols or amines. Phenols suitable for use as additives in accordance with the invention are, for example, hydroquinone, hydroquinone methyl ether, 2,3-(di-tert.butyl)-hydroquinone, 1,3,5-trimethyl-2,4,6-tris-(3,5-di-tert.butyl-4-hydroxybenzyl)-benzene; pentaerythritol tetra-kis-3-(3,5-ditert.butyl-4-hydroxyphenyl)-propionate; n-octadecyl-3,5-ditert.-butyl-4-hydroxyphenyl)-propionate; 4,4-methylene-bis-(2,6-di-tert.butylphenol); 4,4-thiobis-(6-tert.butyl-o-cresol); 2,6-di-tert.butylphenol; 6-(4-hydroxy-phenoxy)-2,4-bis-(n-octylthio)-1,3,5-triazine; di-n-octadecyl-3,5-di-tert.butyl-4-hydroxybenzyl phosphonates; 2-(n-octylthio)-ethyl-3,5-ditert.butyl-4-hydroxybenzoate; and sorbitol hexa [3-(3,5-ditert.butyl-4-hydroxyphenyl)-propionate]; and p-hydroxydiphenylamine or N,N'-diphenylenediamine or phenothiazine.

Other additives may be incorporated in the hotmelt pressure-sensitive adhesive in order to vary certain properties. These other additives include, for example, dyes, such as titanium dioxide, fillers, such as talcum, clay and the like.

The radiation-crosslinkable hotmelt pressure-sensitive adhesive according to the invention contains as component (I) non-elastomeric polymers from the group consisting of ethylene/n-butyl acrylate copolymers, ethylene/(meth) acrylic aid copolymers, amorphous polyolefins, for example polypropylene homopolymer, propylene/butene copolymers, propylene/hexene copolymers and, in particular, amorphous poly-α-olefins (APAOs) produced by metallocene catalysis. However, polyamides are also preferably used as component (I), optionally providing the hotmelt pressure-sensitive adhesive with additional flexibility, toughness and strength. Certain hydrophilic polymers may also be added as component (I), including for example polyvinyl alcohol, hydroxyethyl cellulose, hydroxypropyl cellulose, polyvinyl methyl ether, polyethylene oxide, polyvinyl pyrrolidone, polyethyl oxazolines or starch or cellulose esters, more particularly the acetates with a degree of substitution of less than 2.5 which, for example, increase the wettability of the adhesives.

Component (I) is present in the hotmelt pressure-sensitive adhesive according to the invention in a quantity of 0 to 20% by weight.

In addition, the radiation-crosslinkable hotmelt pressure-sensitive adhesive according to the invention may contain adhesion promoters as component (J). Adhesion promoters are substances which improve the adhesive strength of materials to be combined with one another. In particular, adhesion promoters are intended to improve the ageing behavior of bonds in humid atmospheres. Typical adhesion promoters are, for example, ethylene/acrylamide comonomers, polymeric isocyanates, reactive organosilicon compounds and phosphorus derivatives. According to the invention, the phosphorus derivatives disclosed in WO 99/64529 (page 7, line 14 to page 9, line 5), for example 2-methacryloyloxyethyl phosphate, bis-2-(methacryloyloxyethyl)-phosphate or mixtures thereof, are preferably used as adhesion promoters. Compounds containing carboxylic acids may also be used as adhesion promoters. Compounds of this type are disclosed, for example, in WO 01/16244 (page 7, line 7 to page 8, line 31) or in WO 00/29456 (page 11, line 15 to page 12, line 2). Commercially available products are obtainable, for example, from UCB Chemicals, B-1620 Drogenbos, Belgium as products of the "Ebecryl" class, for example Ebecryl 168 or Ebecryl 170.

Component (J) is present in the adhesive in a quantity of 0 to 20% by weight and preferably in a quantity of 1 to 15% by weight.

For applications involving temperatures above 160° C. and more particularly above 180° C. to 210° C., the hotmelt pressure-sensitive adhesive contains polyphenylene oxide (PPO) as component (K). Polyphenylene oxide is described in U.S. Pat. No. 5,910,526 and in U.S. Pat. No. 5,750,622 and is available, for example, from General Electric Plastics as Noryl®, PPO 803, PPO 808, SA 120 or SA 407. The polyphenylene oxide used for the purposes of the invention preferably has a glass transition temperature (Tg) of 150 to 210° C. PPO is present in the adhesive as component (K) in quantities of 0 to 20% by weight and preferably in quantities of 1 to 10% by weight. Hotmelt pressure-sensitive adhesives distinguished by high pressure-sensitive tackiness can be obtained by corresponding formulation.

In one embodiment of the invention, the hotmelt pressure-sensitive adhesive contains:

0 to 40% by weight of at least one natural or synthetic, non-radiation-crosslinkable elastomer as component (A), 15 to 40% by weight of at least one compound containing at least two olefinic double bonds as component (B), 20 to 85% by weight of a tackifying resin as component (C), 0 to 10% by weight of at least one photoinitiator, photosensitizer and/or controller molecule as component (D), 0 to 15% by weight of at least one compound from the group of mercaptans and/or thio compounds with a functionality of two or more as component (E), 0 to 30% by weight of a plasticizer as component (F), 0 to 30% by weight of a wax as component (G), 0 to 3% by weight of an auxiliary and additive as component (H), 0 to 20% by weight of non-elastomeric polymers from the group of ethylene/n-butyl acrylate copolymers, ethylene/(meth)acrylic acid copolymers, amorphous polyolefins, propylene/butene copolymers, propylene/hexene copolymers and amorphous poly-α-olefins produced by metallocene catalysis as component (I), 0 to 20% by weight of an adhesion promoter as component (J), 0 to 20% by weight of a polyphenylene oxide (PPO) as component (K) and 0 to 40% by weight of elastomers from the group of component (A), these elastomers being modified by at least two radiation-crosslinkable functional groups, for example acrylate, methacrylate or epoxide groups, as component (L).

In a preferred embodiment, the hotmelt pressure-sensitive adhesive according to the invention contains:

5 to 20% by weight of at least one elastomer from the group of styrene copolymers, ethylene/vinyl acetate copolymers or mixtures of these copolymers as component (A), 0 to 35% by weight and preferably 1 to 30% by weight of at least one butadiene homopolymer or copolymer with a 1,2-vinyl content of 30 to 90% as component (B2), 0 to 35% by weight and preferably 1 to 30% by weight of at least one diacrylate oligomer as component (B3), 45 to 75% by weight of at least one tackifying resin from the group of terpene hydrocarbons as component (C), 3 to 10% by weight of at least one photoinitiator as component (D), 0.1 to 1% by weight of at least one antioxidant as component (H), 0 to 20% by weight of a plasticizer as component (F), the sum of components (A) to (H) being 100% by weight.

In another preferred embodiment, the hotmelt pressure-sensitive adhesive according to the invention contains:

15 to 20% by weight of at least one styrene block polymer as component (A), 15 to 30% by weight of at least one butadiene homopolymer or copolymer with a 1,2-vinyl content of 30 to 90% as component (B2), 45 to 60% by weight of at least one tackifying resin from the group of terpene hydrocarbons as component (C), 3 to 10% by weight of at least one photoinitiator as component (D), 0.1 to 1% by weight of at least one antioxidant as component (H), 5 to 12% by weight of at least one thio compound with a functionality of at least two as component (E), the sum of components (A) to (E) being 100% by weight.

In another preferred embodiment, the hotmelt pressure-sensitive adhesive according to the invention contains 5 to 20% by weight of at least one styrene block polymer as component (A), 15 to 35% by weight of a diacrylate oligomer as component (B3), 45 to 60% by weight of at least one tackifying resin from the group of terpene hydrocarbons as component (C), 0.5 to 3% by weight of at least one photoinitiator as component (D), 0.1 to 1% by weight of at least one antioxidant as component (H), 10 to 20% by weight of a plasticizer based on a naphthenic mineral oil as component (F), the sum of components (A) to (H) being 100% by weight.

The hotmelt pressure-sensitive adhesive according to the invention is generally prepared by mixing. The optional plasticizers (component (F)), optional waxes and resins (components (G) and (C)) are premixed at 120° C. to 180° C., more particularly at 160° C., to form a homogeneous melt. After the addition of optional auxiliaries and additives (component (H)), optional photoinitiator and/or photosensitizer (component (D)) and optional sulfur-group-containing crosslinker (component (E)), the compound containing at least two olefinic double bonds (component (B)), the optional adhesion promoter (component (J)) and, finally, the optional elastomer (component (A) and/or component (L)) and optionally other non-elastomeric polymers (component (I)) and optionally polyphenylene oxide (component (K)) are added with stirring and the whole is stirred to homogeneity.

After the completely homogenized composition has been introduced into suitable containers, it is left to cool, solidifying in the process. The hotmelt pressure-sensitive adhesive according to the invention is generally solid at 20° C. and very largely free from solvents which would cause problems during application from the melt. The melt could of course be directly applied to a substrate without cooling and thus directly used for bonding without cooling. However, like other commercially available hotmelt pressure-sensitive adhesives, the hotmelt pressure-sensitive adhesive according to the invention is normally melted before use and then applied to the substrate to be bonded.

The hotmelt pressure-sensitive adhesives according to the invention are used to bond such substrates as glass, coated or uncoated paper or corresponding cardboards and, above all, plastics such as, for example, PET, PEN, PP, PVC, PS and PE. For example, containers or films or laminated films can be produced in this way. The hotmelt pressure-sensitive adhesives according to the invention are distinguished in particular by very good adhesion to the plastics just mentioned.

The substrates to be bonded are, in particular, hollow containers on the one hand and labels on the other hand. Examples of hollow containers are bottles, cans, drums, tubes or cartridges. They consist essentially of optionally plated or galvanized metal, for example tin plate or aluminium, glass or thermoplastics, such as polyethylene terephthalate, polycarbonate, polyethylene, polypropylene, polyvinyl chloride or polystyrene. A polar plastic, more particularly a polyester, is preferably used. Corresponding hollow containers are used in particular for mineral waters and refreshing drinks.

The labels consist on the one hand of thermoplastics, such as polyethylene, polypropylene, polystyrene, polyvinyl chloride or cellophane. It is preferred to use labels of a film based on nonpolar plastics, more particularly oriented polypropylene (OPP). However, the labels may also be based on paper, optionally in combination with a polymer. Depending on the material and the production process, the following labels, for example, may be used: simple labels of nonfinished paper, labels of surface-finished paper, high-gloss labels of cast-coated label papers, labels of papers coated with aluminum by vapor deposition and labels of aluminum-lined papers.

The shape of the labels does not have to meet any particular requirements. For example, the labels may be wrap-around labels and shield labels.

The hotmelt pressure-sensitive adhesives according to the invention are particularly suitable for labeling hollow containers, more particularly of plastics, which are filled with liquids capable of forming gases. Such containers may be, for example, PET bottles for holding carbonated beverages. These liquids and the substances capable of forming gases present in them—collectively referred to here as the contents—have the ability to produce dimensional changes in the hollow containers.

Such dimensional changes occur, for example, in the event of changes in volume of the contents of the hollow container. The dimensional change in the hollow container consists, for example, in an expansion when the contents are introduced or when the contents are exposed to increases in temperature. In the case of labels overlap-bonded with commercially available hotmelt adhesives, the dimensional change in the hollow container often causes the bond seam to shift. This exposes part of the adhesive layer so that soiling, for example, can occur. After exposure to UV light or electron beams, the hotmelt pressure-sensitive adhesive according to the invention shows very little tendency to creep, particularly in the region of the overlap bond, and high strength of the overlap bond. This means that there is only very slight, if any, (tangential) shifting of the overlap-bonded labels in the event of dimensional changes in the hollow containers surrounded by the overlap-bonded labels. Problems such as, for example, soiling of the adhesive layer exposed by the shift are thus prevented.

In another particular use, the hotmelt pressure-sensitive adhesives according to the invention are suitable for labeling aerosol cans or contour bottles with subsequent shrinking on of the labels. In general, the shrinkable labels are shrunk onto the contour of the aerosol can in a few seconds at temperatures of at least 250° C. With labels bonded using known pressure-sensitive adhesives, the overlap bond shifts under the effect of the heat treatment required for the shrinking process.

Where the hotmelt pressure-sensitive adhesives according to the invention are used, neither the pick-up bond nor the overlap bond separates, nor is there any shifting of the overlap bond.

For problem-free processing, the hotmelt pressure-sensitive adhesives according to the invention have a suitably low viscosity before their exposure to radiation. At 120° C., their viscosity is in the range from 100 mPa.s to 1,500 mPa.s, preferably in the range from 180 mPa.s to 1,100 mPa.s and more particularly in the range from 250 mPa.s to 700 mPa.s, as measured to Brookfield (ASTM D 3236-88).

Thus, the hotmelt pressure-sensitive adhesives according to the invention have the necessary low viscosity at low processing temperatures which is required, for example, for their use on temperature-sensitive labels, for plastic labels (generally OPP). The processing temperatures are in the range from 70° C. to 150° C. and preferably in the range from 90° C. to 140° C. The low viscosity also guarantees the clean operation of commercially available roller labeling machines (for example Krones ContiRoll, KHS Carmichael, Sasib Rollquattro, etc.). Soiling, for example in the form of stringing (so-called angel's hair), is avoided in particular in high-speed machines (>30,000 hollow containers/h).

The high tackiness ensures safe pick-up of the labels in high-speed machines. High-speed machines are understood in particular to be labeling machines with a processing capacity of 30,000 to 120,000 hollow containers—generally bottles—per hour and per gluing station.

The hotmelt pressure-sensitive adhesives are processed in labeling machines which apply the hotmelt pressure-sensitive adhesive to the label or to the hollow container using segments (for example Krones Contiroll), rollers (for example Krones Canmatic) or nozzles (for example Langguth E 62). In general, the adhesive is applied in such a way that a pick-up zone (label on hollow container) and an overlap zone (label end on beginning) exist. The hotmelt pressure-sensitive adhesive according to the invention may be used both as a pick-up adhesive and as an overlap adhesive. This simplifies the labeling process; for example it eliminates the need for a second melting tank.

However, two different hotmelt adhesives may also be used, for example to guarantee removal from the hollow container.

After the hotmelt pressure-sensitive adhesive according to the invention has been applied and the parts to be bonded have been joined together (for example label to hollow container and/or label to label), the hotmelt pressure-sensitive adhesive according to the invention is exposed to a suitable dose of UV radiation or electron beams. Suitable means, for example, that the hotmelt pressure-sensitive adhesive has sufficient adhesion and joins the substrates, but shows very little, if any, creepage. Transparent labels are preferably used for UV radiation. High ultimate adhesion and heat resistance are achieved through the branching or crosslinking induced by the radiation which opens up the following applications in the labeling field:

Labeling of aerosol cans or contour bottles with subsequent shrinking-on of the labels. Through the use of the hotmelt pressure-sensitive adhesives according to the invention, neither the pick-up bond nor the overlap bond is broken. The (slight) upward curling of the label corners often observed during this process is avoided where the hotmelt pressure-sensitive adhesives according to the invention are used. The hotmelt pressure-sensitive adhesives used in accordance with the invention are distinguished not only by the high heat resistance already mentioned, but also and in particular by relatively high cohesion and adhesion.

Labeling to produce the properties of an originality closure. On account of the high adhesion, labels or even strips (duty strips, etc.) of various materials, such as OPP for example, can only be opened by tearing. Labels such as these can be used, for example, in tamper-proof labeling because, if an attempt is made to remove the label used as a seal-like closure, clear traces in the bonded surface are proof of the attempted removal.

Labeling with stringent demands on the storage stability of the labeled goods. Articles labeled using the hotmelt pressure-sensitive adhesives according to the invention, more particularly labeled hollow containers, can be stored for long periods at temperatures of 60° C. or higher. This property may be used, for example, for hot beverages which are displayed in corresponding heating cabinets and designed for consumption in situ.

Labeling with subsequent pasteurization, for example using superheated steam, is made possible by the use of the hotmelt pressure-sensitive adhesives according to the invention. By virtue of the high heat resistance of the bond, any residual heat present is not a problem.

Heat stress occurring during processing (for example during the shrink wrapping of trays) can be easily and safely overcome without any adverse effect on the bond.

After exposure to UV radiation or electron beams, the hotmelt pressure-sensitive adhesives according to the invention have a slight tendency to creep and may still be tacky, depending on the exposure time and the requirements. Tack can be qualitatively evaluated. When the adhesive layer is touched, for example with a finger, tack is evident. In the context of the present invention, a slight tendency to creep is understood to mean that, after a) application of the hotmelt pressure-sensitive adhesive according to the invention in a layer thickness of 50 to 100 g/m$^2$ to a 48–52 µm thick shrink-wrap film of OPP, b) exposure to UV radiation or electron beams, c) overlap bonding of film to film, d) heating of the overlap bond for 24 h at 60° C., the movement of the bond seam before heating compared with after heating is 5 mm or less, preferably 3 mm or less and, more particularly, 1 mm or less.

The invention is used quite generally in the manufacture of disposable articles (hygiene articles) or in the packaging field, more particularly in labeling, in the sealing of cardboard boxes and in bookbinding.

The invention is illustrated by the following Examples.

EXAMPLES

I. Starting Components a) butadiene/styrene copolymer without BHT (STEREON 841) from Firestone
b) terpene hydrocarbon resin, modified (SYLVARES ZT 105 LT) from Arizona Chemical
c) polybutadiene 70% 1,2-polymer, stab. with 100 ppm BHT (RICON 150) from Colorado Chemical
d) 3,3'-thiodipropionic acid dilauryl ester (IRGANOX PS 800) from Ciba-Geigy
e) 2-hydroxy-2-methylpropiophenone (DAROCUR 1173) from Ciba Geigy
f) pentaerythritol-PO-adduct, mercaptan-terminated, trifunctional (CAPCURE 3-800) from Cognis Corporation
g) pentaerythritol tetrakis-[3(3,5-di-tert-butyl-4-hydroxyphenyl)-propionate], (IRGANOX 1010 D) from Ciba-Geigy
h) PHOTOMER 4127 F: neopentylglycol propoxylate diacrylate from Cognis Corporation
i) NYFLEX 222 B: naphthenic mineral oil from Nynas
j) ESACURE KIP 150: oligo-[2-hydroxy-2-methyl-1-[4-(1-methylvinyl)]phenyl]propanone from Lamberti
k) IRGACURE 369: 2-benzyl-2-dimethyl-amino-1-(4-morpholino-phenyl)-butan-1-ol from Ciba Geigy
l) EVATANE HT 28–800: ethylene/vinylacetate copolymer from Atofina
m) VECTOR 4111 D: SIS block polymer from Exxon Mobil (Dexco).
n) VECTOR 4461 D: styrene/butadiene/styrene block polymer from Exxon Mobil
o) ISOLENE 400: polyisoprene from Ter Hell & Co. GmbH

II. Production of the Hotmelt Pressure-Sensitive Adhesives by

Mixing

The formulations are prepared by the standard process known to the expert, i.e., polymers (component (A) and (B)) and resins (component (C)) are first mixed in a laboratory stirrer at 160° C. until they appear visually uniform (homogeneous). The other formulation ingredients are then added and, again, completely homogenized. This generally takes a total of ca. 60 to 120 mins. Depending on the composition, the melt is transparent, opaque or cloudy (the same applies to the melt cooled to room temperature). The melt mixture is introduced into containers and then cooled, solidifying in the process. After cooling, it is used for different purposes according to its composition.

III. Formulation Examples

Example 1

Formulation of:
175.0 g butadiene/styrene copolymer without BHT, CARN 9003-55-8 (STEREON 841 A);
595.0 g terpene hydrocarbon resin, modified, CARN 82347-62-4 (SYLVARES ZT 105 LT);
225.0 g polybutadiene 70% 1,2-polymer, stab. with 100 pap BHT, CARN 61789-96-6/9003-17-2 (RICON 150);
2.5 g pentaerythritol tetrakis-[3-(3,5-di-tert-butyl-4-hydroxyphenyl)-propionate], CARN 6683-19-8 (IRGANOX 1010 D);
2.5 g 3,3'-thiodipropionic acid dilauryl ester CARN 123-28-4 (IRGANOX PS 800); and
50 g 2-hydroxy-2-methylpropiophenone, CARN 7473-98-5 (DAROCUR 1173).

Example 2

Formulation of:
175.0 g butadiene/styrene copolymer without BHT, CARN 9003-55-8 (STEREON 841 A);
595.0 9 terpene hydrocarbon resin, modified, CARN 82347-62-4 (SYLVARES ZT 105 LT);
225.0 g polybutadiene 70% 1,2-polymer, stab. with 100 pap BHT, CARN 61789-96-6/9003-17-2 (RICON 150);
2.5 g pentaerythritol tetrakis-[3-(3,5-di-tert-butyl-4-hydroxyphenyl)-propionate], CARN 6683-19-8 (IRGANOX 1010 D);
2.5 g 3,3'-thiodipropionic acid dilauryl ester CARN 123-28-4 (IRGANOX PS 800);
50 g 2-hydroxy-2-methylpropiophenone, CARN 7473-98-5 (DAROCUR 1173); and
105 g pentaerythritol-PO-adduct, mercaptan-terminated, trifunctional, CARN 101359-87-9 (CAPCURE 3-800).

Example 3

| Raw materials | Quantity in g |
| --- | --- |
| STEREON 841 A | 16.5 |
| SYLVARES ZT 105 LT | 56.5 |
| PHOTOMER 4127 F | 24.0 |
| NYFLEX 222 B | 13.0 |
| IRGANOX 1010 DD | 0.25 |
| ESACURE KIP 150 | 1.0 |
| Total | 111.25 |

Example 4

| Raw materials | Quantity in g |
| --- | --- |
| EVATANE 28-800 | 16.5 |
| SYLVARES ZT 105 LT | 56.5 |
| PHOTOMER 4127 F | 24.0 |
| NYFLEX 222 B | 13.0 |
| IRGANOX 1010 DD | 0.25 |
| ESACURE KIP 150 | 1.0 |
| Total | 111.25 |

Example 5

| Raw materials | Quantity in g |
| --- | --- |
| EVATANE 28-800 | 16.5 |
| SYLVARES ZT 105 LT | 56.5 |
| PHOTOMER 4127 F | 24.0 |
| NYFLEX 222 B | 13.0 |
| IRGANOX 1010 DD | 0.25 |
| IRGACURE 369 | 1.0 |
| Total | 111.25 |

Example 6

| Raw materials | Quantity in g |
|---|---|
| STEREON 841 A | 8.25 |
| EVATANE 28-800 | 8.25 |
| SYLVARES ZT 105 LT | 56.5 |
| PHOTOMER 4127 F | 24.0 |
| NYFLEX 222 B | 13.0 |
| IRGANOX 1010 DD | 0.25 |
| ESACURE KP 150 | 1.0 |
| Total | 111.25 |

Example 7

| Raw materials | Quantity in g |
|---|---|
| STEREON 841 A | 8.25 |
| EVATANE 28-800 | 8.25 |
| SYLVARES ZT 105 LT | 56.5 |
| PHOTOMER 4127 F | 24.0 |
| NYFLEX 222 B | 13.0 |
| IRGANOX 1010 DD | 0.25 |
| IRGACURE 369 | 1.0 |
| Total | 111.25 |

Example 8

| Raw materials | Quantity in g |
|---|---|
| VECTOR 4111 D | 16.5 |
| SYLVARES ZT 105 LT | 56.5 |
| PHOTOMER 4127 F | 24.0 |
| NYFLEX 222 B | 13.0 |
| IRGANOX 1010 DD | 0.25 |
| ESACURE KIP 150 | 1.0 |
| Total | 111.25 |

Example 9

| Raw materials | Quantity in g |
|---|---|
| STEREON 841 A | 8.25 |
| VECTOR 4111 D | 8.25 |
| SYLVARES ZT 105 LT | 56.5 |
| PHOTOMER 4127 F | 24.0 |
| NYFLEX 222 B | 13.0 |
| IRGANOX 1010 DD | 0.25 |
| ESACURE KIP 150 | 1.0 |
| Total | 111.25 |

Example 10

| Raw materials | Quantity in g |
|---|---|
| VECTOR 4461 D | 16.5 |
| SYLVARES ZT 105 LT | 56.5 |
| PHOTOMER 4127 F | 24.0 |
| NYFLEX 222 B | 13.0 |
| IRGANOX 1010 DD | 0.25 |
| ESACURE KIP 150 | 1.0 |
| Total | 111.25 |

Example 11

| Raw materials | Quantity in g |
|---|---|
| STEREON 841 A | 8.25 |
| VECTOR 4461 D | 8.25 |
| SYLVARES ZT 105 LT | 56.5 |
| PHOTOMER 4127 F | 24.0 |
| NYFLEX 222 B | 13.0 |
| IRGANOX 1010 DD | 0.25 |
| ESACURE KIP 150 | 1.0 |
| Total | 111.25 |

IV. Results

1. Stringing

Formulations 1 to 11 according to the invention show very little, if any, stringing.

2. Creep test

A) Under Load

A transparent OPP film (Mobil ROSO 30 LR 400) is bonded with a 1.5 cm overlap. The adhesive layer thickness is 60 μm. The bond is then exposed to an H lamp (100% output) at a belt speed of 25 m/min. (Fusion Model VPS/I 600). 2.5 cm wide and 10 cm long test specimens are then cut out perpendicularly of the overlap, placed in a recirculating air drying cabinet and vertically loaded with a 210 g weight at 40° C. The time elapsing before the weight drops off is measured. Non-irradiated test specimens and test specimens bonded with a commercially available hotmelt adhesive for labeling (EUROMELT 362, Henkel KGaA) are also measured for comparison. All values are the averages of 6 measurements.

TABLE 1

Results for 2A), creep test under load

| | Time in mins. |
|---|---|
| Commercially available hotmelt | 15 |
| Formulation Example 3, non-irradiated | 0.5 |
| Formulation Example 3, irradiated | >3 Days |

B) Load-Free

1.) The shrink-wrap film (ROSO LR 400, OPP film from Exxon Mobil Chemical) is cut to the following dimensions: 6.7 cm tall=non-shrinking and 17.9 cm wide with a 6 mm wide clear strip=shrinking 2.) The adhesive is heated to 125–130° C. and applied in a width of 6 mm to the clear section of film using a suitable applicator, for example a coating knife (quantity applied: 50–100 g/m²)

3.) A glass plate measuring 20 cm×20 cm×5 mm (preheated for 15–30 mins. at 125° C. in a recirculating air drying cabinet) is used as a support. It is important to ensure that only the clear section is applied to avoid premature shrinkage of the film as a whole.

4.) With the still warm adhesive layer on the film, an aluminium cup (diameter 50 mm, height 80 mm, wall thickness 0.3 mm) is overlappingly labeled, i.e. film to film, the bond being subjected to firm finger pressure.

5.) The bond is then irradiated using the following combination of lamps: Fusion Model VPS/I600 adjusted to a maximum output level of 100% (240 W/cm). The focus of the lamp is adjusted to the diameter of the cup, i.e. to +5 cm. The speed range in which the measurement is carried out is between 10 m/min. and 50 m/min. The manufacturer is Fusion UV Systems GmbH, Martinsried, Germany.

6.) The bond or bond seam is marked with a felt-tip pen, after which the cup is stored in a drying cabinet for 24 hours at 60° C.

7.) The creep value is then measured as the distance of the bond or bond seam from the felt-tip pen mark after heating. Adhesion and tack are qualitatively evaluated.

In all of Examples 1 to 11, the bond seam had shifted by less than 5 mm after heating.

V. Description of the Measuring Methods

Melt Viscosity, Brookfield Model RVT DV II, 150° C., Spindle 27; to ASTM D 3236-88

Stringing

A glass rod is inserted into the hotmelt adhesive melted at ca. 160° C. and then slowly withdrawn. The Theological behavior of the hotmelt is visually evaluated. The evaluation includes the manner in which the molten adhesive drips from the glass rod and the formation of threads of adhesive during withdrawal of the glass rod from the adhesive melt.

What is claimed is:

1. A low-creep radiation-crosslinkable hotmelt pressure-sensitive adhesive composition comprising:
    (A) 0 to 40% by weight of at least one natural or synthetic, non-radiation-crosslinkable elastomer as component (A);
    (B) 15 to 40% by weight of at least one radiation-crosslinkable compound containing at least two olefinic double bonds selected from the group consisting of component (B1), component (B2) and component (B3), wherein
        (B1) component (B1) is at least one diolefin homopolymer and/or copolymer having olefinic double bonds along the main chain and having a percentage content of recurring diolefin units being 50 to 100% by weight selected from the group consisting of homo- or copolymers of ,1,3-pentadiene, 2-ethyl-1 3-butadiene, 2-propyl-1,3-butadiene, 2-isopropyl-1,3-butadiene, 2-hexyl-1,3-butadiene, 2,3-dimethyl-1,3-butadiene, 2,3-diethyl-1,3-butadiene, 2-methyl-1,3-pentadiene, 2-methyl-1,3-hexadiene, 2-methyl-1,3-octadiene, 2-methyl-1,3-decadiene, 2,3-dimethyl-1,3-pentadiene, 2,3-dimethyl-1,3-hexadiene, 2,3-dimethyl-1,3-octadiene, 2,3-dimethyl-1,3-decadiene, 2-methyl-1,3-cyclopentadiene, 2-methyl-1,3-cyclohectadiene, 2,3-dimethyl-1,3-cyclopentadiene, 2,3-dimethyl-1,3-cyclohexadiene, 2-chloro-1,3-butadiene, 2,3-dichloro-1,3-butadiene, 1-fluoro-1,3-butadiene, 2-chloro-1,3-pentadiene, 2-chloro-1,3-cyclopentadiene and 2-chloro-1,3-cyclohexadiene;
        (B2) component (B2) is at least one compound having olefinic double bonds in the side chains and having a percentage content of recurring diolefin units of 50 to 100% by weight and a percentage content of vinylic double bonds of from 5 to 100%, based on the total number of olefinic double bonds in component (B2), selected from the group consisting of
            i) homopolymers and/or alternating copolymers and/or statistical gradient copolymers of 1,3-butadiene, 2-methyl-1,3-butadiene (isoprene), 1,3-pentadiene and/or cyclopentadiene; and
            ii) homo- and/or copolymers of monomers selected from the group consisting of 1,3-butadiene, 2-methyl-1,3-butadiene, 1,3-pentadiene and/or cyclopentadiene which contain at least one functional group selected from the group consisting of hydroxyl groups, amino groups, epoxide groups, isocyanate groups, carboxyl groups, carboxylic anhydride groups, mercapto groups, silane groups and hydrosilyl groups;
        (B3) component (B3) is at least one acrylate or methacrylate ester with a (meth)acrqlate functionality of at least two selected from the group consisting of acrylate and methacrylate esters of aromatic polyols, aliphatic polyols, cycloaliphatic polyols, and polyether alcohols; and
    (C) 20 to 85% by weight of at least one tackifying resin as component (C); wherein said adhesive composition is solid at 20 degrees C and does not contain any sulfur-group-containing crosslinker.

2. A low-creep radiation-crosslinkable hotmelt pressure-sensitive adhesive as claimed in claim 1, wherein at least one of component (B1) or component (B2) is present in said adhesive and is modified by at least one radiation-crosslinkable functional group other than olefinic double bonds.

3. A low-creep radiation-crosslinkable hotmelt pressure-sensitive adhesive composition as claimed in claim 1, wherein component (B2) is present in said adhesive com-Dosttion and is a copolymer obtained i) by reaction of two or more monomers selected from the group consisting of 1,3-butadiene, 2-methyl-1,3-butadiene, 1,3-pentadiene and cyclopentadiene or ii) by reaction of one or more monomers selected from the group consisting of 1,3-butadiene, 2-methyl-1,3-butadiene, 1,3-pentadiene and cyclopentadiene with one or more monomers selected from the group consisting of 2,3-dimethyl-1,3-butadiene, 1,4-pentadiene, 2,3-pentadiene, ethylene, propylene, butylene, hexene, octene, acrylesters, aciylonitrile, vinyl esters, and vinyl nitrile.

4. A low-creep radiation-crosslinkable hotmelt pressure-sensitive adhesive composition as claimed in claim 1, wherein component (A) is present in said adhesive composition and is selected from the group consisting of acrylates, polyester urethanes, ethylene acrylates, butyl rubbers; natural rubber; ethylene/propylene copolymers; ethylene/vinyl acetate copolymers, styrene copolymers and mixtures thereof.

5. A low-creep radiation-crosslinkable hotmelt pressure-sensitive adhesive as claimed in claim 1, wherein component (A) is present in said adhesive and is comprised of at least one styrene block polymer.

6. A low-creep radiation-crosslinkable hotmelt pressure-sensitive adhesive composition comprising:

- 5 to 20% by weight of at least one elastomer selected from the group consisting of styrene block copolymers, ethylene/vinyl acetate copolymers and mixtures thereof as component (A);
- 15 to 40% by weight of at least one radiation-crosslinkable compound selected from the group consisting of butadiene homopolymers with a 1,2-vinyl content of 30 to 90%, alternating and statistical gradient copolymers of butadiene with a 1,2-vinyl content of 30 to 90% and (meth)acrylate esters of polyother alcohols as component (B);
- 20 to 85% by weight of at least one tackifying resin as component (C);
- 0.1 to 10% by weight of at least one photoinitiator as component (D);
- 0 to 30% by weight of at least one plasticizer as component (F); and
- 0.1 to 1% by weight of at least one antioxidant as component (H);

wherein said adhesive composition is solid at 20 degrees C and does not contain depolymerizod polymer any sulfur-group-containing crosslinker.

7. A low-creep radiation-crosslinkable hotmelt pressure-sensitive adhesive as claimed in claim , wherein at least one of component (B1) or component (B2) is present in said adhesive and is modified by at least one radiation-crosslinkable functional group other than olefinic double bonds selected from the group consisting of acrylate groups, methacrylate groups and epoxide groups.

8. A low-creep radiation-crosslinkable hotmelt pressure-sensitive adhesive ags claimed in claim 1, wherein component (A) is present in said adhesive and is selected from the group consisting of styrene/diene block copolymers, styrene/ethylene/butylene block copolymers and styrenelethyfenelpropylene/styrene block copolymers.

9. A low-creep radiation-crosslinkable hotmelt pressure-sensitive adhesive as claimed in claim 1, wherein component (B2) is present in said adhesive and is selected from the group consisting of home- and copolymers of monomers selected from the group consisting of 1,3-butadiene, 2-methyl-1,3-butadiene, 1,3-pentadiene and cyclopentadiene which contain two or three functional groups.

10. A low-creep radiation-crosslinkable hotmelt pressure-sensitive adhesive as claimed in claim 1, wherein component (B2) is present in said adhesive and is selected from the group consisting of homo- and copolymers of monomers selected from the group consisting of 1,3-butadiene, 2-methyl-1,3-butadiene, 1,3-pentadiene and cyclopentadiene which contain two or three functional groups selected from the group consisting of hydroxyl groups, amino groups, epoxide groups, isocyanate groups carboxyl groups, carboxylic anhydride groups, mercapto groups, silane groups and hydrosilyl groups.

11. A low-creep radiation-crosslinkable hotmelt pressure-sensitive adhesive as claimed in claim 1, wherein component (B3) is present in said adhesive and is selected from the group consisting of dipropylene glycol diacrylate, tnpropylene glycol diacrylate, tetrapropylene glycol diacylate, neopentyl glycol propoxylate di(meth)acrylates, trimethyloipropane tri(meth)acryiate, trimethyloipropane monoethoxytri (meth)acrylate and pentaerythritol triacrylate.

12. A low-creep radiation-crosslinkable hotmelt pressure-sensitive adhesive composition as claimed in claim 1, wherein component (C) comprises a terpene hydrocarbon resin.

13. A low-creep radiation-crosslinkable hotmeft pressure-sensitive adhesive composition as claimed in claim 1, additionally compnsing at least one photoinitiator.

14. A low-creep radiation-crosslinkable hotmelt pressure-sensitive adhesive as claimed in claim 1, wherein component (A) is comprised of at least one styrene black polymer, component (B) is comprised of at least one of polybutadiene, polyisoprene or a (meth)acrylate ester of a polyol selected from the group consisting of aromatic polyols, aliphatic polyols, cycloaliphatic polyols, and polyether alcohols, and said adhesive additionally comprises at least one photoinitiator.

15. A low-creep radiation-crosslinkable hotmelt pressure-sensitive adhesive composition as claimed in claim 1 additionally comprising at least one non-elastomeric polymer selected from the group consisting of ethylene/n-butyl acrylate copolymers, ethylene/(meth)acrylic acid copolymers, amorphous polyolefins, polyamides, and polyphenylene oxide.

16. A low-creep radiation-crosslinkable hotmelt pressure-sensitive adhesive composition as claimed in claim 1 additionally comprising at least one adhesion promoter.

17. A process for attaching a label to an article selected from the group consisting of hollow plastic containers, aerosol cans, and contour bottles, said process comprising joining said label to said article using a radiation-crosslinkable hotmelt pressure-sensitive adhesive therfore and exposing said adhesive to radiation selected from the group consisting of UV radiation and electron beam radiation.

18. A process as claimed in claim 17 wherein at least one of either said label or said article is comprised of plastic.

19. A process for attaching a label to a substrate, said process comprising joining said label to said substrate using a radiation-crosslinkable hotmelt pressure-sensitive adhesive in accordance with claim 1 and exposing said adhesive to radiation selected from the group consisting of UV radiation and electron beam radiation.

20. A process as claimed in claim 19 wherein at least one of either said label or said substrate is comprised of plastic.

21. A process for attaching a label to a substrate, said process comprising joining said label to said substrate using a radiation-crosslinkabte hotmelt pressure-sensitive adhesive in accordance with claim 6 and exposing said adhesive to radiation selected from the group consisting of UV radiation and electron beam radiation.

22. A process as claimed in claim 21 wherein both said label and said substrate are comprised of plastic.

* * * * *

UNITED STATES PATENT AND TRADEMARK OFFICE
CERTIFICATE OF CORRECTION

PATENT NO. : 7,156,944 B2
APPLICATION NO. : 11/042600
DATED : January 2, 2007
INVENTOR(S) : Moeller et al.

It is certified that error appears in the above-identified patent and that said Letters Patent is hereby corrected as shown below:

Column 21, claim 1 bridging lines 57 and 58, delete "2-ethyl-1 3-butadiene" and insert therefor --2-ethyl-1,3-butadiene--.

Column 22
Line 27, claim 1 delete "(meth)acrqlate" and insert therefor --(meth)acrylate--.
Bridging lines 43 and 44, delete "com- Dosttion" and insert therefor --composition--.

Column 23
Line 10, claim 6 delete "polyother" and insert therefor --polyether--.
Line 21, claim 6 delete "depolymerized polymer".
Line 24, claim 7 after the word "claim" insert --1--.
Line 31, claim 8 delete "ags" and insert therefor --as--.
Claim 8 bridging lines 34 and 35, delete "styrenelethyfenelpropylene/styrene" and insert therefor --styrene/ethylene/propylene/styrene--.
Line 39, claim 9 delete "home-" and insert therefor --homo- --.
Line 57, claim 11 delete "tnpropy-" and insert therefor --tripropy- --.

Column 24
Line 1, delete "diacylate" and insert therefor --diacrylate--.
Line 2 through line 3, delete "trimethyloipropane tri(meth)acryiate, trimethyloipropane monoethoxytri" and insert therefor --trimethylolpropane tri(meth)acrylate, trimethylolpropane monoethoxytri- --
Line 9, delete "hotmeft" and insert therefor --hotmelt--.
Line 11, delete "compnsing" and insert therefor --comprising--.
Line 14, delete "black" and insert therefor --block--.
Line 35, delete "therfore" and insert therefor --in accordance with claim 1--.

UNITED STATES PATENT AND TRADEMARK OFFICE
CERTIFICATE OF CORRECTION

PATENT NO. : 7,156,944 B2
APPLICATION NO. : 11/042600
DATED : January 2, 2007
INVENTOR(S) : Moeller et al.

It is certified that error appears in the above-identified patent and that said Letters Patent is hereby corrected as shown below:

<u>Column 24</u> (contd')
Line 50, delete "radiation-crosslinkabte" and insert therefor --radiation-crosslinkable--.

Signed and Sealed this

Twentieth Day of March, 2007

JON W. DUDAS
*Director of the United States Patent and Trademark Office*